L. C. HOYLE.
FILTERS FOR TEA AND COFFEE POTS.
No. 183,005. Patented Oct. 10, 1876.
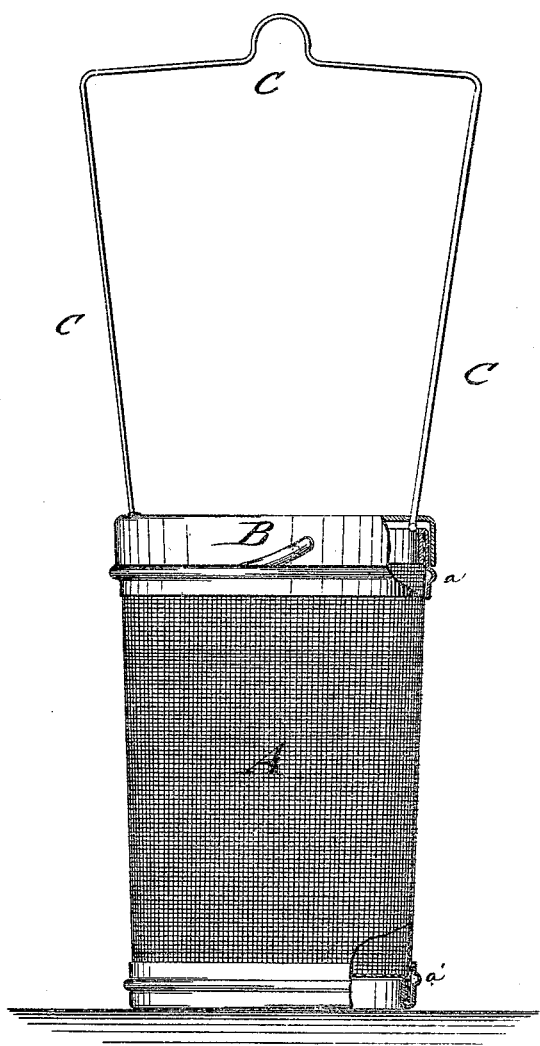

UNITED STATES PATENT OFFICE.

LOREN C. HOYLE, OF SUTTON, MASSACHUSETTS.

IMPROVEMENT IN FILTERS FOR TEA AND COFFEE POTS.

Specification forming part of Letters Patent No. 183,005, dated October 10, 1876; application filed February 28, 1876.

*To all whom it may concern:*

Be it known that I, LOREN C. HOYLE, of Sutton, Worcester county, Massachusetts, have invented a new and Improved Filter for Tea and Coffee Pots, of which the following is a specification:

The drawing represents a side elevation of my improved filter for tea and coffee pots.

The object of my invention is to furnish an improved filter for tea and coffee pots, that takes up the tea or coffee and retains the same without closing up the spout, keeping the tea or coffee clear, and strained of leaves and sediment.

The invention will first be fully described in connection with drawing, and then pointed out in the claim.

In the drawing, A represents the filter, that is made of plain or twilled wire-cloth at the side and bottom parts, the wire-cloth being stiffened and held in position by tin mountings or rims $a$ at the top and bottom edges $a'$. The bottom part is supported at some distance above the lower rims, to be raised above the bottom of the pot when the filter is placed in the same. The cover or lid B is made to close tightly on the top rim of the filter, being fastened by lugs and slots, grooves, hinges, or in any other suitable manner, to the main part of the filter. A spring wire-frame, C, is applied to the cover B, one of the legs of the same being loose, to admit the exact adjustment of the spring-frame to the pot in which the filter is to be used. The spring-frame C widens toward its upper part, and has a lateral or bridge part, which is bent to impart the spring action to the sides or legs of the frame.

The filter rests on the bottom rim, and is firmly held in position in the pot by the binding action of the spring-frame on the walls of the pot.

The spring-frame serves also as a handle to insert and remove filter into or from the pot, leaving the strained or clear fluid in the pot or can.

The filter forms thus a very neat and useful device for family and other purposes.

I am aware that it is not, broadly, new to make a reticulated filter for coffee or tea pots; but

What I claim is—

The combination, with the wire-cloth body A, the ends of which are protected by the overlapping bindings $a$ $a'$, the cover B, provided with upwardly-diverging spring-frame, substantially as and for the purpose specified.

LOREN C. HOYLE.

Witnesses:
 JOSEPH H. NASON,
 HENRY F. BALCOME.